UNITED STATES PATENT OFFICE.

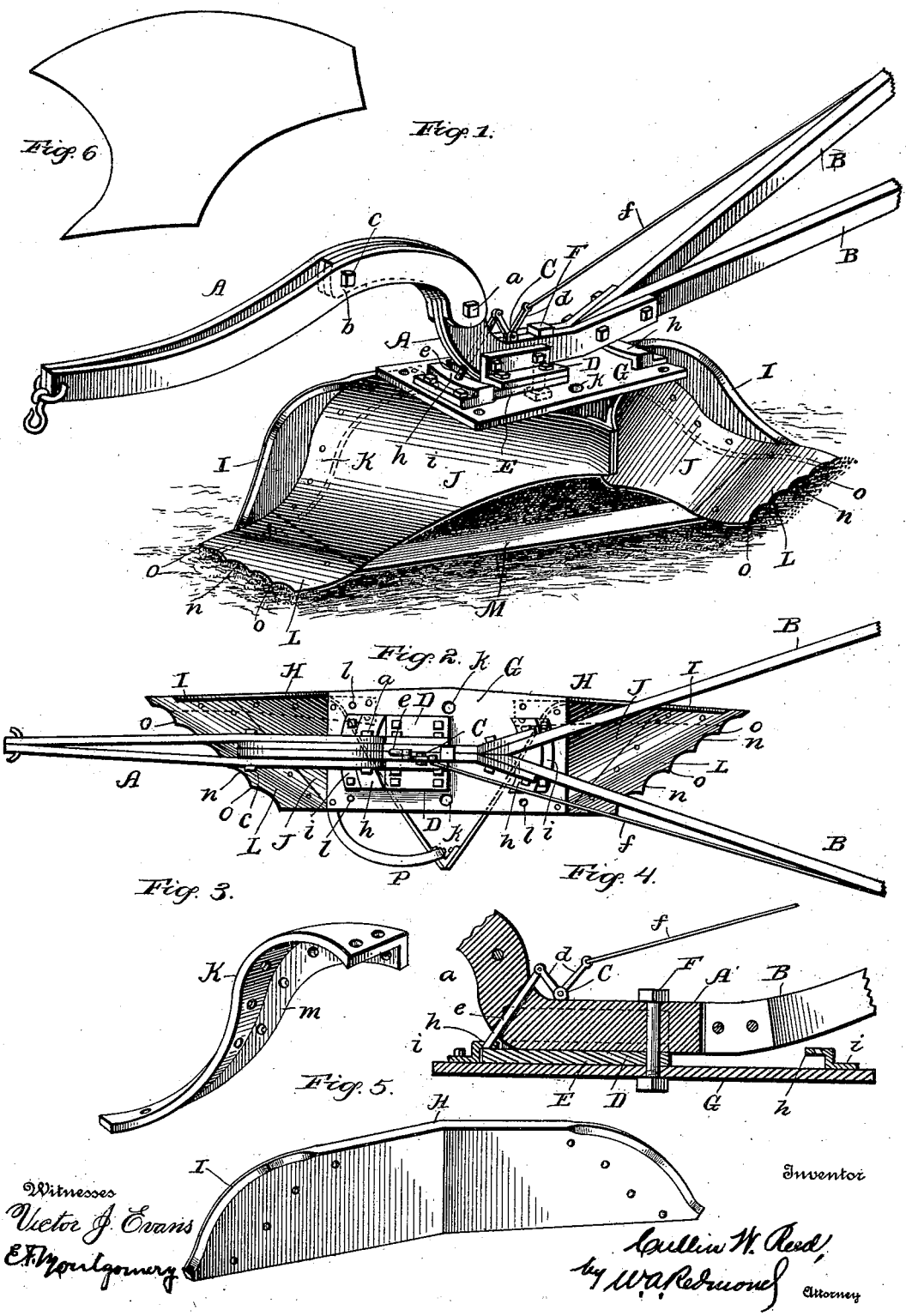

CULLIN W. REED, OF OAKLEY, MICHIGAN.

PLOW.

SPECIFICATION forming part of Letters Patent No. 621,943, dated March 28, 1899.

Application filed January 25, 1898. Serial No. 667,861. (No model.)

*To all whom it may concern:*

Be it known that I, CULLIN W. REED, a citizen of the United States, residing at Oakley, in the county of Saginaw and State of Michigan, have invented certain new and useful Improvements in Plows; and I do declare the following to be a full, clear, and exact description of the invention, such as will enable others skilled in the art to which it appertains to make and use the same.

This invention relates to plows, and particularly to reversible plows; and it has for its object to provide a plow which is adapted to work true and easy no matter what the width of the furrow it is cutting and to otherwise improve the different parts of such plows; and it consists in the parts and combinations of parts hereinafter described and claimed.

In the accompanying drawings, forming a part of this specification, Figure 1 is a perspective view of my improved plow; Fig. 2, a plan view of the same; Fig. 3, a detail perspective of one of the frogs; Fig. 4, a detail longitudinal section of the inner end of the beam; Fig. 5, a detail perspective of the landside, and Fig. 6, a diagrammatic view showing the pattern from which the moldboard is formed.

Similar letters refer to similar parts throughout all the views.

The beam of my plow consists of the curved sections or bars A A', pivotally connected by the bolt $a$, the section A being vertically adjustable on the sections A' by means of a series of perforations $b$ in said sections and a bolt or pin $c$ for securing said section A in its adjusted position. It will be observed that the point of connection at the end of section A with section A' is in a direct line with and above the center of draft, so that a line drawn from the center of draft will pass directly through the outer end of the beam and to the point of connection of the lugs with the hames on the animal drawing the plow. Thus the plow may be adjusted to cut furrows of different depths by adjusting the section A vertically, so as to raise or lower the plow; but such adjustment does not affect or change the line of draft, the same being always direct from the center to the animal's shoulder, as explained, nor cause the plow to run on the point or heel. This is accomplished by reason of the fact that no change is made in the pivotal point of connection of section A with section A', while in all other plows with which I am familiar the depth of the furrow is regulated by adjustment of the clevis at the end of the beam, which results in raising the plow-point for a shallow furrow, and thus causing the lowering of the heel, or in lowering the point for a deeper furrow, and thus causing the heel to be raised. The result of such adjustments is that the plow is made to work hard and when running on the heel is liable to be thrown out of the ground by any obstacle in the way of the point and at all times is hard to manage and to be kept in the ground, whereas with my beam the plow is held level at all times in the furrow owing to the fact that no change is made in the line of draft.

The handles B are bolted between the flaring ends of section A', which for convenience is made in two parts, but which may be of a single piece, if desired, as may also the section A. To a split lug or ear C, secured to section A', an elbow-lever $d$ is pivoted, one arm of which carries a pin $e$ for locking the beam in position when applied to a reversible plow, and to the other arm of said crank-lever is connected a rod $f$ for operating the pin $e$.

The section A' of the beam is bolted between the angle-irons D, which are bolted to a plate E of slightly-greater length than said irons, the forward edge of which is formed on the arc of a circle coincident with the pivot-bolt F, which edge is adapted to project under the curved flanges $h$ of plates $i$, bolted to the table G, in order to prevent oscillation of the beam.

The flanges $h$ are each formed with an inclined perforation to receive the pin $e$ in order to lock the beam against horizontal movement after it has been reversed. One end of each of the flanges $h$ is closed, as at $j$, in order to limit the movement or swing of the beam and to arrest the same in a position to permit of the pin $e$ readily entering the perforation in said flanges. The beam is pivotally secured to the plow by the bolt F, which extends vertically through the same and through a perforation in the table G and is secured by a nut. The table G is formed with a series of perforations, as at $k$, across the same for the pivot-bolt F, and also with additional bolt-holes, as at *l*, for the bolts, which secure the plates *i* to the table, whereby the beam may be bodily shifted transverse the table and readily secured in place. The object of this construction is to enable the plow to cut furrows of different widths and at the same time enable the plow to run true and straight in the line of draft. So far as I am aware it is the custom to adjust the plow for a wider or narrower furrow by simply turning the end of the beam to or from the landside, as on a pivot, thus throwing the plow out of the line of draft and causing it to set at an angle to the same and therefore to cut quartering. This results in making the plow work hard and in throwing on the operator and animals a great deal of unnecessary work in the effort to make the plow run true. With my invention the shifting of the beam bodily obviates these objectionable features and enables me to run a straight true furrow of any desired width with great ease.

The landside H is preferably made of a single piece of metal inclining from its center toward each end, where it is applied to a reversible plow, as is shown in the drawings, for the purpose of throwing the rear end of the landside away from the land to reduce the friction; but whether the landside is made double for use in a reversible plow or single for a non-reversible plow it is made or formed in one piece with the colter I, thus doing away with a joint and making the colter more stable and better adapted to perform its functions. The moldboard J is of peculiar construction, as will be described, and is bolted to a frog K, curved to correspond with the curvature of the moldboard and which is formed with a flange *m*, whereby it is bolted to the landside, and said moldboard is also bolted to a bar M. The plow-point L is also bolted to the frog at one side and to the bar M at the other. The bar M extends lengthwise the plow and is bolted to and forms a brace for both the moldboards and plow-points. The plate G is bolted to the frog H and to the moldboard. The moldboard is formed from a sheet or plate of steel cut into the pattern or shape shown in Fig. 6 and is then rolled to a cylindrical form, as shown in Fig. 1, whereby there are no compound or reverse curves formed in the moldboard. With a moldboard of this form stubble or any standing crop or even straw strewn to a depth of several inches on the land can be wholly turned under and covered, as has been demonstrated practically by this plow, since the slice is completely and wholly turned over by the moldboard after it has been separated from the land.

The plow-point is formed with a scalloped cutting edge comprising a series of indentations *n* and points or projections *o*, all of which are of the same size, the indentations being rounded out, as shown.

I am aware that it has been proposed to make a plow-point with notches or a serrated edge; but this device was not a practical success, for the reason that it soon clogged up with roots and grass and rendered the plow inoperative. I am also aware that a plow-point having a series of scallops formed therein beginning the same at a distance from the nose and increasing them successively in depth as they approach the rear end of the cutting edge of the point has been proposed. This device serves the purpose of cutting roots, &c., but it will not prevent the side pressure on the plow, for the reason that at the point where such pressure occurs—immediately at the point or nose of the plow—there is no provision made to relieve it by scalloping the edge.

The primary object of my invention in so far as the plow-point is concerned is to greatly reduce, if not wholly obviate, all side pressure, and this I accomplish practically by forming the point with a scalloped cutting edge from end to end. I am also enabled to set my plow-point more nearly square than would be possible with either of the forms named, which is a great advantage.

An attachment (see Fig. 2) consisting of a curved bar P, secured at one end to the forward projecting upper corner of the moldboard and having its other end curved back to and secured to the outer end of the moldboard, may be used for the purpose of turning under long grass and stubble, if desired.

It will be understood that the moldboard may be cut from either a tube or cylinder or from a flat plate or sheet on which the pattern for the moldboard has been marked and then bent or rolled cylindrically, as required.

Having thus described my invention, what I claim as new, and desire to secure by Letters Patent, is—

1. A plow-point having its cutting edge from point to heel formed with a series of rounded indentations of uniform or equal depth and a series of intermediate points or projections.

2. A moldboard for plows formed from a cylindrical sheet or plate of metal, whereby the curve is continuously cylindrical throughout the moldboard.

3. A landside for reversible plows having a straight bottom edge and made in one piece and inclining from its center toward each end and provided with integral colters.

4. A beam for reversible plows formed in sections pivoted together in a plane at the center of the line of draft of the plow and adjustably secured together at a point in the line of draft and forward of the center of the same.

5. A moldboard for double or reversible plows consisting of two cylindrical moldboards rigidly secured together at their outer or furrow ends.

6. The combination in a reversible plow of a pivoted beam, retaining-flanges to prevent oscillation of the beam, and means for locking the beam in its adjusted position.

7. The combination, in a plow, of a cylindrically-curved moldboard, and a curved bar rigidly connected at one end to the upper forward end of said moldboard and at the other end to the outer end of said moldboard, whereby long grass and stubble may be turned under.

In testimony whereof I affix my signature in presence of two witnesses.

CULLIN W. REED.

Witnesses:
E. F. MONTGOMERY,
HELEN E. PARKER.